(12) United States Patent
Kasahara

(10) Patent No.: US 7,395,411 B2
(45) Date of Patent: Jul. 1, 2008

(54) METHODS AND APPARATUS FOR IMPROVING PROCESSING PERFORMANCE BY CONTROLLING LATCH POINTS

(75) Inventor: Eiji Kasahara, Austin, TX (US)

(73) Assignee: Sony Computer Entertainment Inc., Tokyo (JP)

( * ) Notice: Subject to any disclaimer, the term of this patent is extended or adjusted under 35 U.S.C. 154(b) by 305 days.

(21) Appl. No.: 11/079,565

(22) Filed: Mar. 14, 2005

(65) Prior Publication Data

US 2006/0206731 A1    Sep. 14, 2006

(51) Int. Cl.
*G06F 9/312* (2006.01)
*G06F 9/315* (2006.01)

(52) U.S. Cl. ....................................................... 712/200
(58) Field of Classification Search ................. 712/200; 713/300, 320, 324, 340
See application file for complete search history.

(56) References Cited

U.S. PATENT DOCUMENTS

| | | | | |
|---|---|---|---|---|
| 5,434,520 A | * | 7/1995 | Yetter et al. ................. | 326/93 |
| 5,649,174 A | * | 7/1997 | Dockser ...................... | 713/501 |
| 5,933,651 A | * | 8/1999 | Masuda et al. ............... | 712/42 |
| 5,983,339 A | * | 11/1999 | Klim ........................... | 712/200 |
| 6,209,020 B1 | * | 3/2001 | Angle et al. ................. | 718/108 |
| 6,247,134 B1 | * | 6/2001 | Sproch et al. ............... | 713/320 |
| 6,412,061 B1 | * | 6/2002 | Dye ............................. | 712/32 |
| 6,505,294 B2 | * | 1/2003 | Pappalardo et al. ......... | 712/232 |
| 6,526,491 B2 | | 2/2003 | Suzuoki et al. | |
| 6,839,830 B2 | * | 1/2005 | Liu ............................. | 712/200 |
| 6,972,598 B2 | * | 12/2005 | Yoo ............................. | 326/95 |
| 7,131,017 B2 | * | 10/2006 | Schmit et al. ............... | 713/323 |
| 7,301,384 B2 | * | 11/2007 | Hamdan et al. ............. | 327/291 |

FOREIGN PATENT DOCUMENTS

| | | |
|---|---|---|
| JP | 09-319578 | 12/1997 |
| JP | 2003-316566 | 11/2003 |

OTHER PUBLICATIONS

Office Action in corresponding JP Patent Application No. 2006-061086, dated Sep. 12, 2006, 3 pgs.

* cited by examiner

*Primary Examiner*—Eric Coleman
(74) *Attorney, Agent, or Firm*—Matthew B. Dernier; Kaplan Gilman Gibson & Dernier LLP

(57) ABSTRACT

Methods and apparatus provide for performing pre-execution processes to prepare instructions of an instruction set for further processing; executing the instructions in a pipeline of execution stages using digital logic for processing data in accordance with the instructions within one clock cycle per stage; latching the data each clock cycle for delivery to a next execution stage using one or more of a plurality of latch point circuits; and controlling each of the latch point circuits to operate as a buffer or as a latch.

29 Claims, 11 Drawing Sheets

FIG. 4
<u>108</u>
110  5F04, 10F04, 15F04, 30F04
 5F04
 5F04, 10F04
 5F04,        15F04
 5F04, 10F04
 5F04
 5F04, 10F04, 15F04, 30F04
 5F04
 5F04, 10F04
 5F04,        15F04
.
.
.

METHODS AND APPARATUS FOR IMPROVING PROCESSING PERFORMANCE BY CONTROLLING LATCH POINTS

BACKGROUND

The present invention relates to methods and apparatus for improving processing performance by controlling the latch points in, a processing system, such as a pipelined system.

In recent years, there has been an insatiable desire for faster computer processing data throughputs because cutting-edge computer applications involve real-time, multimedia functionality. Graphics applications are among those that place the highest demands on a processing system because they require such vast numbers of data accesses, data computations, and data manipulations in relatively short periods of time to achieve desirable visual results. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

Semiconductor process technologies increase about every 18 months, with the current process being 90 nm. With the increase in process technology comes an increase in processing frequency and resultant increase in power dissipation. Although the increase in frequency improves processing performance, the increase in power dissipation is not desirable. Although, some have proposed decreasing the operating voltage to reduce the power dissipation, this has an undesirable complication: the leakage current increases.

SUMMARY OF THE INVENTION

One or more embodiments of the present invention may provide for improving processing performance in new processing technologies without increasing the frequency of operation, thereby controlling power dissipation. In accordance the invention, the frequency of operation is reduced while the programmer is provided with the ability to control the depth of the pipeline, the position and number of the latch points, and/or the location and number of the clock distribution points.

The processing system may employ a plurality of configurable latch/buffers, which are each operable to perform a latch function or a buffer function depending upon a control signal. The latch/buffers are preferably disposed at a pitch corresponding to a fabrication metric of the processor and at higher pitches, such as the 10F04 metric, the 15F04 metric, the 30F04 metric, etc. For example, the 10F04 metric (of the 90 nm process) dictates that latches are functionally positioned relatively close together. The 15F04 metric dictates that latches are functionally positioned further apart as compared to the 10F04 metric. And the 30F04 metric dictates that latches are functionally positioned even further apart. As each latch/buffer can operate as a latch or as a buffer, the control signals can establish the number and extent of the latch points in the system.

In response to API code, the processing system is preferably operable to adjust the number of execution stages in the pipeline and also establish proper signaling to the latch/buffers to match the number and position of the latch points to the execution stages. For example, as the number of execution stages decreases, the number of latch points may decrease, thereby reducing power dissipation. Further, the system may disable a number of clock distribution points in the system to match the decrease in execution stages, thereby further reducing power dissipation.

In accordance with one or more aspects of the present invention, a processing system includes: an instruction pre-execution circuit operable to prepare instructions of an instruction set for further processing; and an instruction execution circuit having a plurality of execution stages operable to execute the instructions in a pipeline fashion using one clock cycle per stage, each execution stage including digital logic for processing data in accordance with the instructions and at least one latch point circuit adapted to latch the data each clock cycle for delivery to a next execution stage. The number of execution stages of the instruction execution circuit is variable in response to application programming interface (API) code invoked by a software program running on the processing system.

Each of the latch point circuits may be operable as a buffer or as a latch in response to control signaling. Preferably, the latch point circuits are operable as a buffer or as a latch in response to commands from API code.

The number of execution stages of the instruction execution circuit is preferably controllable by API code. By way of example, the number of execution stages of the instruction execution circuit may be controllable by controlling the number of latch point circuits operating as buffers and the number of latch point circuits operating as latches.

The processing system preferably includes a plurality of clock distribution nodes that are operable to be enabled and disabled. The clock distribution nodes associated with the latch point circuits operating as buffers are preferably disabled, while those associated with latch point circuits operating as latches are preferably enabled. The clock distribution nodes may be enabled and disabled as a function of API code.

In accordance with one or more further aspects of the present invention, a method includes: fabricating a processor using a fabrication process of X nano-meters, which is an advanced process over a Y nano-meter process; operating the processor at a frequency of F despite that the X nano-meter process would permit a frequency of operation of greater than F such that power dissipation is reduced; and adjusting a number of execution stages of the instruction execution circuit in response to application programming interface (API) code invoked by a software program running on the processing system to counter a trend of reduced processing power resulting from the lower frequency of operation.

In accordance with one or more further aspects of the present invention, a method includes: performing pre-execution processes to prepare instructions of an instruction set for further processing; executing the instructions in a pipeline of execution stages using digital logic for processing data in accordance with the instructions within one clock cycle per stage; latching the data each clock cycle for delivery to a next execution stage using one or more of a plurality of latch point circuits; and controlling each of the latch point circuits to operate as a buffer or as a latch.

In accordance with one or more further aspects of the present invention, a storage medium contains at least one software program capable of causing a processing system to perform actions, comprising: performing pre-execution processes to prepare instructions of an instruction set for further processing; executing the instructions in a pipeline of execution stages using digital logic for processing data in accordance with the instructions within one clock cycle per stage; latching the data each clock cycle for delivery to a next execution stage using one or more of a plurality of latch point circuits; and controlling each of the latch point circuits to operate as a buffer or as a latch.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 4 is a block diagram illustrating some details of an instruction execution circuit of the processing system of FIG. 1 in accordance with one or more aspects of the present invention;

DETAILED DESCRIPTION OF THE PRESENT INVENTION

Figure 1:
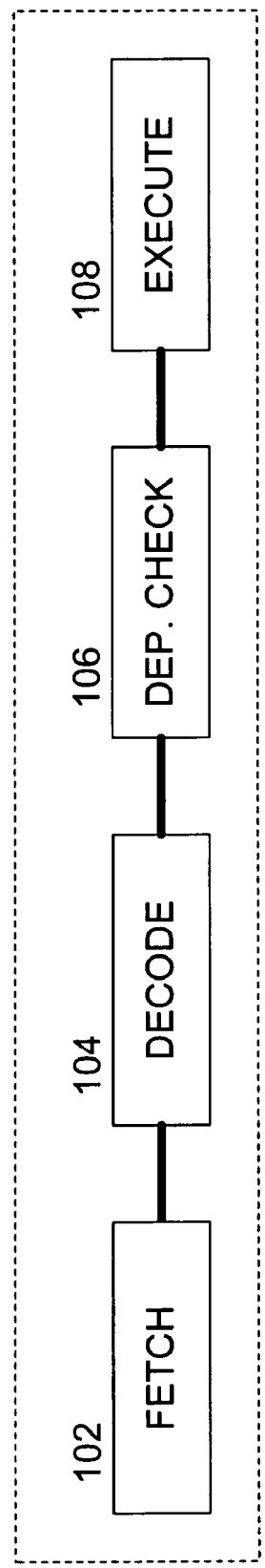
FIG. 1 is a block diagram illustrating the structure of a processing system that may be adapted in accordance with one or more aspects of the present invention.

With reference to the drawings, wherein like numerals indicate like elements, there is shown in FIG. 1 at least a portion of a processing system 100 that may be adapted for carrying out one or more features of the present invention. For the purposes of brevity and clarity, the block diagram of FIG. 1 will be referred to and described herein as illustrating an apparatus 100, it being understood, however, that the description may readily be applied to various aspects of a method with equal force.

The processing system 100 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processing system 100 may include an instruction buffer (not shown), an instruction fetch circuit 102, an instruction decode circuit 104, a dependency check circuit 106, instruction issue circuitry (not shown), and instruction execution stages 108.

The instruction fetch circuitry is preferably operable to facilitate the transfer of one or more instructions from a memory to the instruction buffer, where they are queued up for release into the pipeline. The instruction buffer may include a plurality of registers that are operable to temporarily store instructions as they are fetched. The instruction decode circuit 104 is adapted to break down the instructions and generate logical micro-operations that perform the function of the corresponding instruction. For example, the logical micro-operations may specify arithmetic and logical operations, load and store operations to the memory, register source operands and/or immediate data operands. The instruction decode circuit 104 may also indicate which resources the instruction uses, such as target register addresses, structural resources, function units and/or busses. The instruction decode circuit 104 may also supply information indicating the instruction pipeline stages in which the resources are required.

The dependency check circuit 106 includes a plurality of registers, where one or more registers are associated with each execution stage of the pipeline. The registers store indications (identification numbers, register numbers, etc.) of the operands of the instructions being executed in the pipeline. The dependency check circuit 106 also includes digital logic that performs testing to determine whether the operands of an instruction for entry into the pipeline are dependent on the operands of other instructions already in the pipeline. If so, then the given instruction should not be executed until such other operands are updated (e.g., by permitting the other instructions to complete execution).

The instruction execution circuitry 108 preferably includes a plurality of floating point and/or fixed point execution stages to execute arithmetic instructions. Depending upon the required processing power, a greater or lesser number of floating point execution stages and fixed point execution stages may be employed. It is most preferred that the instruction execution circuitry 108 (as well as the other circuits of the processing system 100) is of a superscalar architecture, such that more than one instruction is issued and executed per clock cycle. With reference to any given instruction, however, the execution circuitry 108 executes the instructions in a number of stages, where each stage takes one or more clock cycles, usually one clock cycle. Further details concerning the structure and operation of the instruction execution circuit 108 will be discussed hereinbelow.

Figure 2:
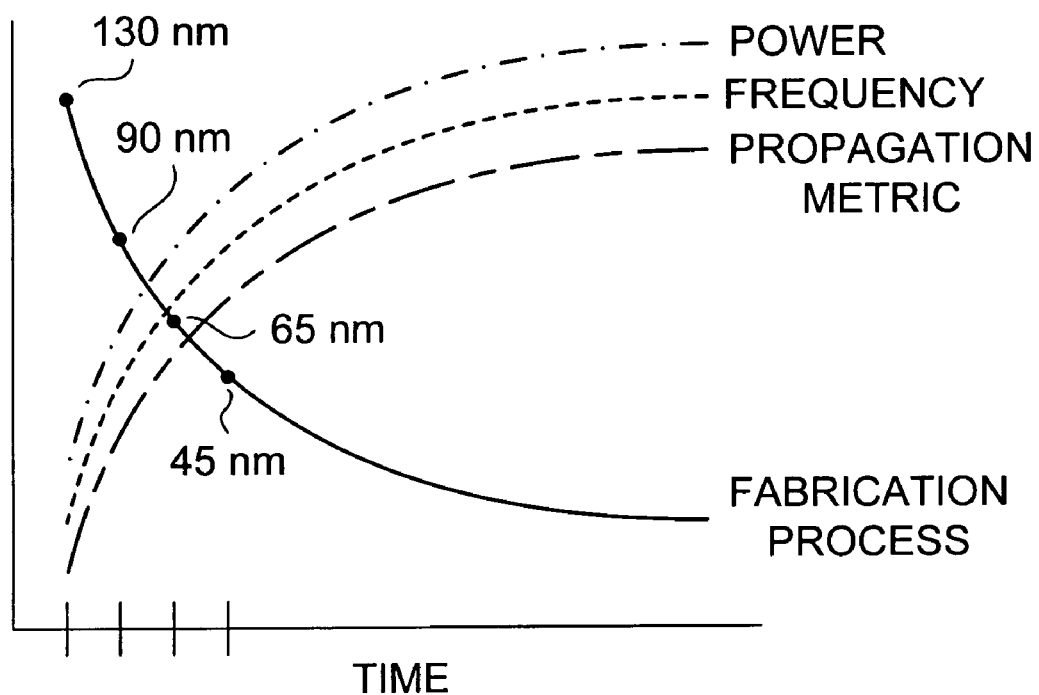
FIG. 2 is a graphical illustration of certain performance parameters of the system of FIG. 1 in accordance with one or more aspects of the present invention.

Reference is now made to FIG. 2, which is a graphical illustration of certain performance parameters of the system 100 of FIG. 1 in accordance with one or more aspects of the present invention. While the present invention is not limited to any theory of operation, it has been discovered that advantageous operation of the system 100 as discussed hereinabove may be achieved when these performance characteristics are taken into consideration during the fabrication, design, implementation, and programming phases of the development of the system. The graph of FIG. 2 shows time along the abscissa axis and relative changes in magnitude along the ordinate axis. The plotted magnitudes as a function of time include the available fabrication processes for semiconductor processing systems, a propagation metric for the fabrication process, the potential frequency of operation of the process, and the power dissipation of a system operating at such frequency.

The semiconductor fabrication process technologies advance about every 18 months, where the state-of-the-art process is 90 nm. Future fabrication processes will likely be 65 nm, 45 nm, etc. As the fabrication process advances over time, the frequency of operation of a processing system employing the fabrication process increases in a corresponding fashion. The increase in operating frequency generally improves the processing performance of a system; however, such increase in frequency is accompanied by an increase in power dissipation, which is not desirable. The propagation metric also improves as a function of the fabrication process advancement.

Figure 3:
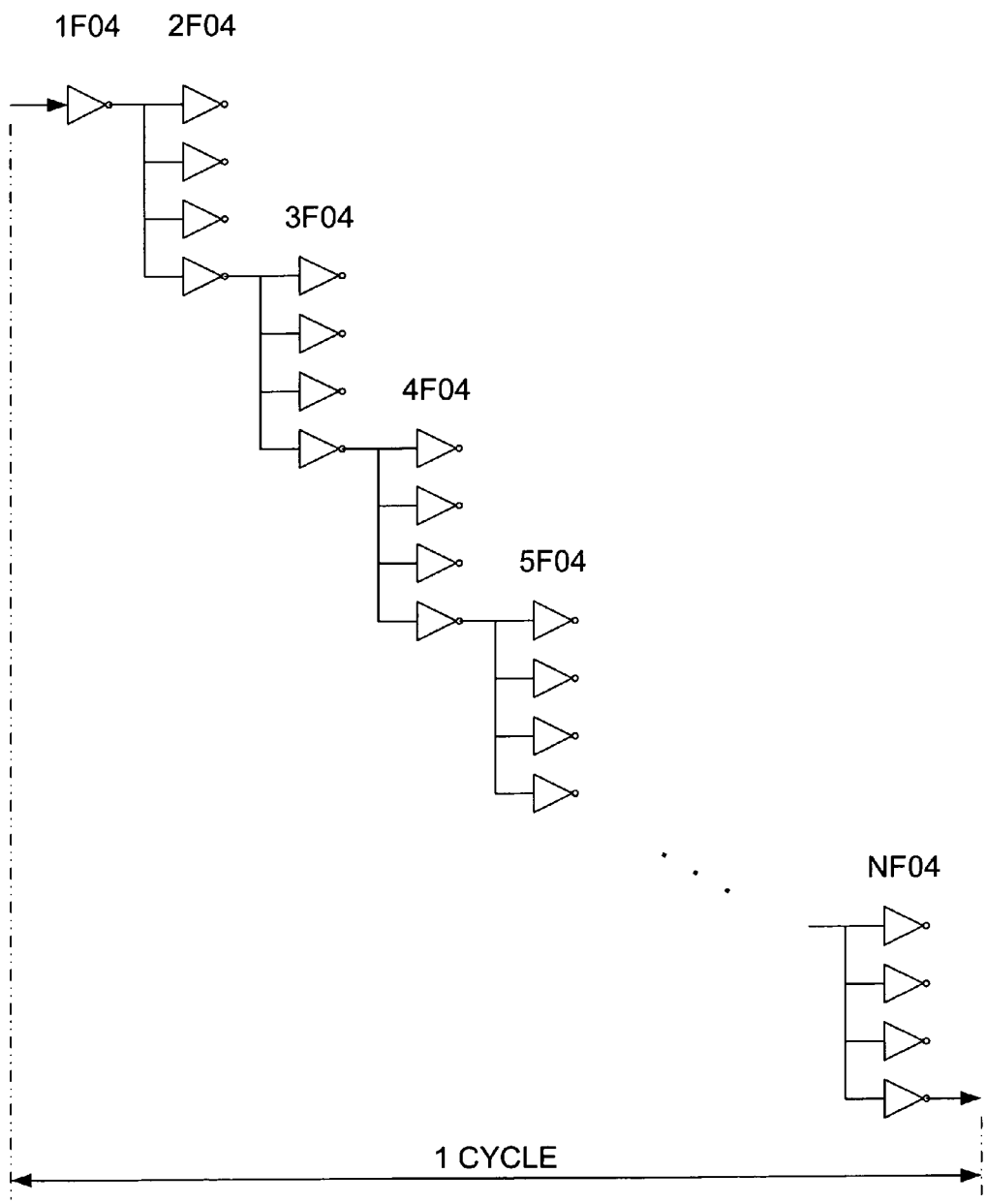
FIG. 3 is a block diagram illustrating some properties of a propagation metric of the processing system in accordance with one or more aspects of the present invention.

With reference to FIG. 3, the propagation metric of interest here is the theoretical signal propagation delay through a series of logic gates fabricated in accordance with the fabrication process. For the purposes of discussion herein, the signal propagation delay is compared against a specific time period, such as one clock cycle. A 1F04 propagation metric indicates that the propagation delay through a single stage of inverter logic gate(s) takes one clock cycle. A 2F04 propagation metric indicates that the single propagation delay through two stages of inverter logic gates takes one clock cycle. A 3F04 propagation metric indicates that the single propagation delay through three stages of inverter logic gates takes one cycle, and so on. Thus, an advancement in the fabrication process from the 90 nm process to the 65 nm process results in a significant improvement in the propagation metric, such as from 10F04 to 15F04 or 20F04, etc.

With reference to FIG. 4, the instruction execution circuit 108 preferably includes a plurality of execution stages, labeled STAGE 1, STAGE 2, etc. Each instruction execution stage includes digital logic for processing data in accordance with the instructions being executed. The instruction execution circuit 108 also includes at least one latch point circuit 110 adapted to latch the data each clock cycle for delivery to a next execution stage. For example, if the STAGE 1 execution stage carries out an ADD micro-operation using its digital logic, the resultant data are preferably stored in the latch point circuit 110 for delivery to a next execution stage and/or to some other point in the pipeline.

The latch point circuits 110 are preferably disposed at a sufficient pitch such that the data may propagate through the digital logic between successive latch point circuits 110 within one clock cycle. In the example illustrated in FIG. 4, the processing system 100 is assumed to have been fabricated utilizing a fabrication process having an 30F04 propagation metric. It is noted that this is an arbitrary fabrication process for illustration purposes only and is not intended to imply that such a process has been employed experimentally or commercially. Irrespective of the particular fabrication process employed, the propagation metric of the fabrication process dictates a minimum pitch for the latch point circuit 110. This minimum pitch is illustrated in FIG. 4 as being the pitch between the STAGE 1 execution stage and the STAGE 7 execution stage, each of which includes a designator of 30F04.

In accordance with one or more aspects of the present invention, the latch point circuits 110 are preferably disposed at a pitch higher than the minimum pitch. In particular, one or more of the execution stages are disposed at a pitch corresponding with a less advanced fabrication process, such would be associated with a 15F04, 10F04, or 5F04 propagation metric. For example, the STAGE 1, STAGE 4, STAGE 7 and STAGE 10 execution stages have latch point circuits 110 disposed at a pitch corresponding with a less advanced fabrication process having a propagation metric of 15F04. Similarly, the STAGE 1, STAGE 3, STAGE 5, STAGE 7 and STAGE 9 execution stages have latch point circuits 110 disposed at a pitch corresponding with a less advanced fabrication process having a propagation metric of 10F04. Finally, the latch point circuits 110 associated with STAGE 1, STAGE 2, STAGE 3, STAGE 3, STAGE 4, ... STAGE 10 are disposed at a pitch corresponding with a fabrication process having a propagation metric of 5F04.

Figure 5:
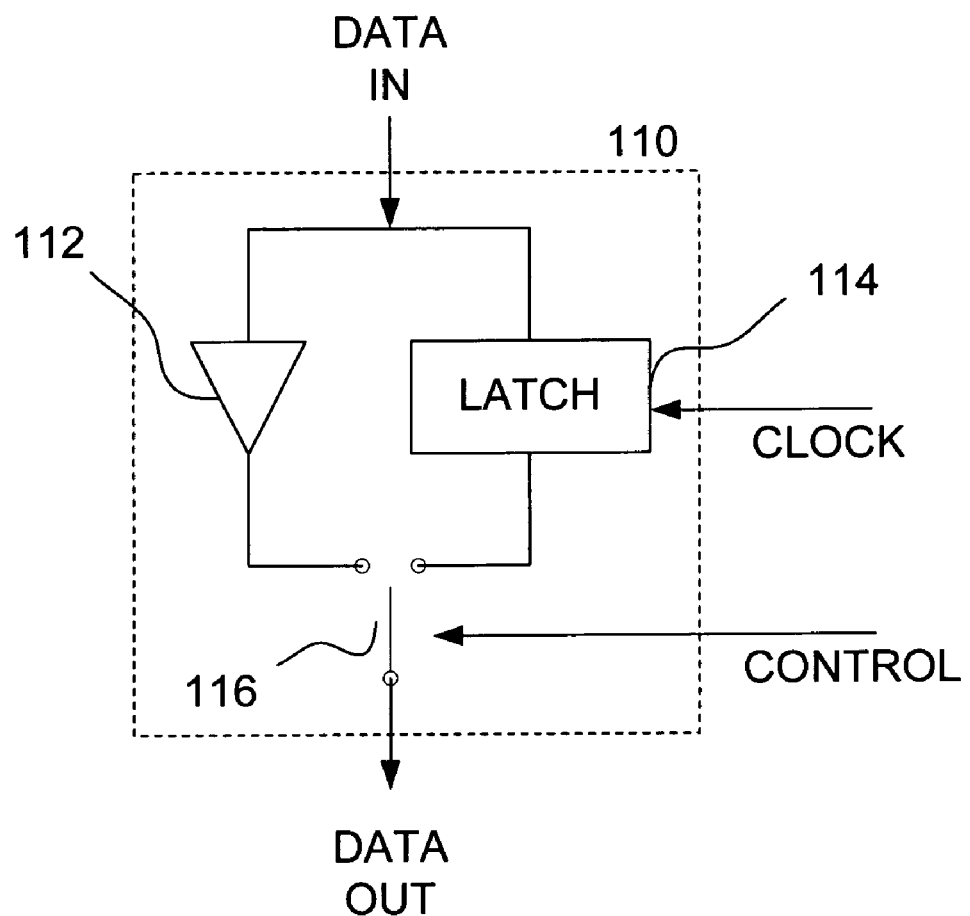
FIG. 5 is a block diagram illustrating some details of a latch point circuit of the processing system of FIG. 1 in accordance with one or more aspects of the present invention.

In accordance with one or more further aspects of the present invention, each of the latch point circuits 110 is preferably operable to act as a buffer or as a latch in response to control signaling. FIG. 5 is block diagram illustrating this functionality of the latch point circuits 110. In particular, each latch point circuit 110 preferably includes a buffer circuit 112, a latch circuit 114 and a control switch circuit 116. When the control signaling is such that the control switch circuit 116 engages a left node, then the data into the latch point circuit 110 flows through the buffer circuit 112. Alternatively, when the control signaling causes the control switch circuit 116 to engage the right node, then the data is subject to the latch circuit 114, whereby the data are latched in accordance with a clock.

In a preferred embodiment, the control signaling is responsive to application program interface (API) code that are invoked by a software program running on the processing system 100. Advantageously, this permits a software designer to change the configuration of a given latch point circuit 110 (or a group of latch point circuits) by way of software running on the processing system 100. When the latch point circuit 110 operates as a buffer, the data are not held up by a latch, but rather continue through to the data output node of the latch point circuit 110 for subsequent use. As will be discussed hereinbelow, this functionality may be utilized in conjunction with varying the depth of the pipeline (e.g., by varying the number of execution stages in the instruction execution circuit 108).

Figure 6:
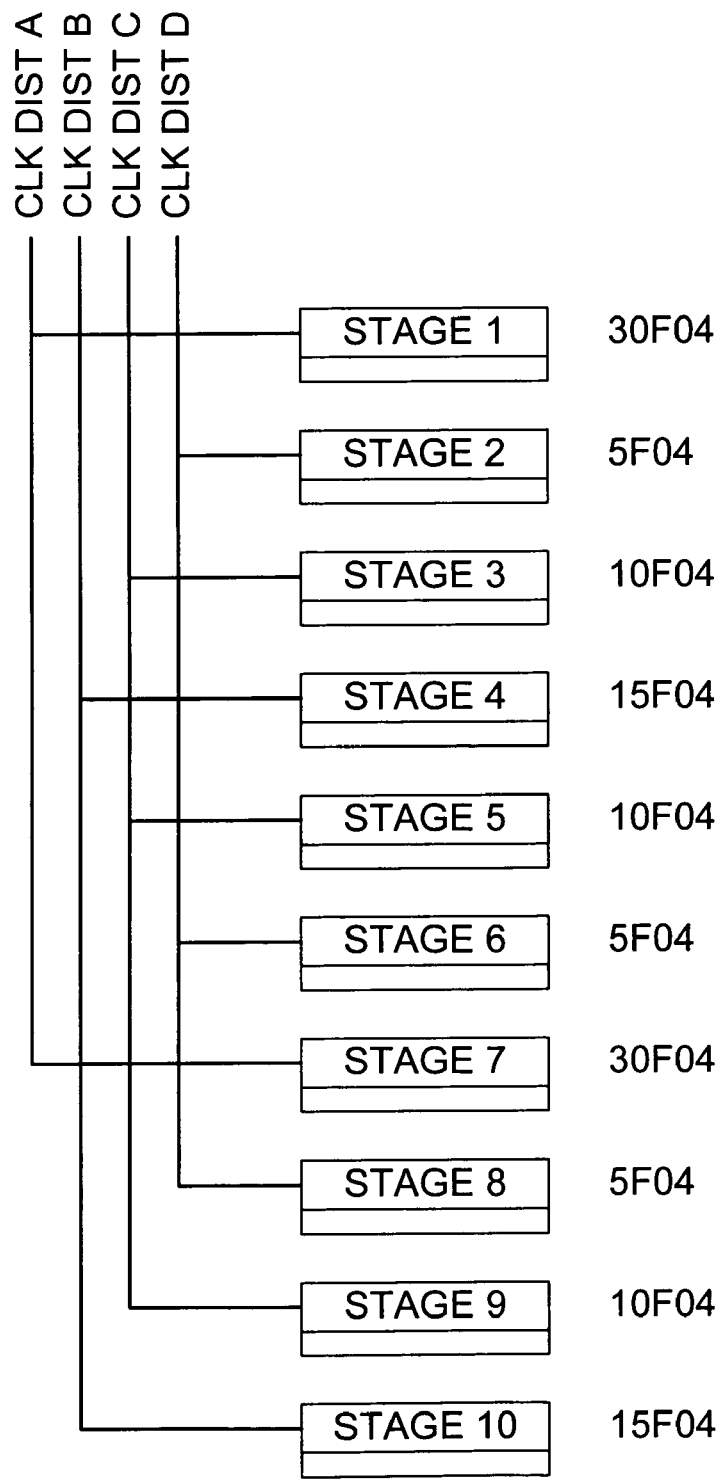
FIG. 6 is a block diagram illustrating further details of the instruction execution circuit of the processing system in accordance with one or more aspects of the present invention.

Reference is now made to FIG. 6, which is a block diagram illustrating further details of the instruction execution circuit 108 of the processing system 100. When the latch point circuit 110 operates as a buffer, there is no need to provide a clocking signal to the latch circuit 114. Indeed, the buffer circuit 112 does not require a clock to perform its function. Consequently, careful routing of clock signals utilizing a clock distribution network yields advantageous results.

A system clock signal is often used by digital circuitry, such as digital circuitry implemented using a LSI circuit, to synchronously execute certain logic functions. The system clock signal of a given LSI circuit is often split into many paths to service many different portions of the digital circuitry. Ideally, the system clock signals at different portions of the digital circuitry exhibit exactly the same timing characteristics so that the different portions of the digital circuitry operate in exact synchronization. In practice, however, the system clock signals at various points throughout the digital circuitry exhibit differing timing characteristics, such as differing rising and/or falling edges (i.e., transitions), differing duty cycles, and/or differing frequencies. This problem is countered by employing a plurality of clock distribution nodes located on the semiconductor chip that ensure synchronous delivery of the system clock to various portions of the LSI circuit.

The processing system 100 of FIG. 6 preferably employs a plurality of clock distribution nodes that are operable to deliver system clock signaling to various portions of the system 100. In FIG. 6, at least some of these clock distribution nodes are labeled CLK DIST A, CLK DIST B, CLK DIST C and CLK DIST D. The clock signaling from the distribution node CLK DIST A is input to the STAGE 1 and STAGE 7 instruction execution stages. It is noted that the latch point circuits 110 of these stages are disposed at a pitch consistent with the 30F04 propagation metric. The clock signaling from distribution node CLK DIST B is input to the STAGE 4 and STAGE 10 instruction execution stages. It is noted that the latch point circuits 110 associated with the execution stages receiving clock signaling from nodes CLK DIST A and CLK DIST B are disposed at a pitch corresponding with the 15F04 propagation metric. The clock signaling from distribution node CLK DIST C is input to the STAGE 3, STAGE 5 and STAGE 9 instruction execution stages. It is noted that the latch point circuits 110 associated with the instruction execution stages receiving clock signaling from nodes CLK DIST A, CLK DIST B and CLK DIST C are disposed at a pitch corresponding with the 10F04 propagation metric. Finally, the clock signaling from the distribution node CLK DIST D is input to the STAGE 2, STAGE 6 and STAGE 8 execution stages. It is noted that the latch point circuits 110 associated with the instruction execution stages receiving clock signaling from all clock distribution nodes are disposed at a pitch corresponding to the 5F04 propagation metric.

In accordance with one or more aspects of the present invention, the clock distribution nodes are preferably operable to be enabled and disabled. For example, the clock distribution nodes associated with latch point circuits 110 operating as buffers are preferably disabled. On the other hand the clock distribution nodes associated with the latch point circuits 110 operating as latches are preferably enabled. The enabling and disabling of the clock distribution nodes is preferably achieved as function of API code such that a programmer may utilize one or more software programs running on the processing system 100 to control the number and extent of the clock distribution nodes. This advantageously permits the programmer to assist in limiting power dissipation of the processing system 100 inasmuch as power dissipation is reduced as the number of clock distribution nodes are disabled.

In accordance with one or more further aspects of the invention, the depth of the pipeline is variable, e.g., the number of execution stages of the instruction execution circuit 108 is preferably variable. For example, it may be desirable to employ a shorter pipeline in some circumstances because this improves processing performance in the face of branch misses, cache misses and/or interrupts. Giving the programmer the option to select the depth of the pipeline using API code provides a mechanism for employing a shorter or longer pipeline depending on whether branch misses, cache misses and/or significant numbers of interrupts are expected.

The number of execution stages of the instruction execution circuit 108 is preferably variable in response to application programming interface (API) code invoked by a software program running on the processing system 100.

Figure 7:
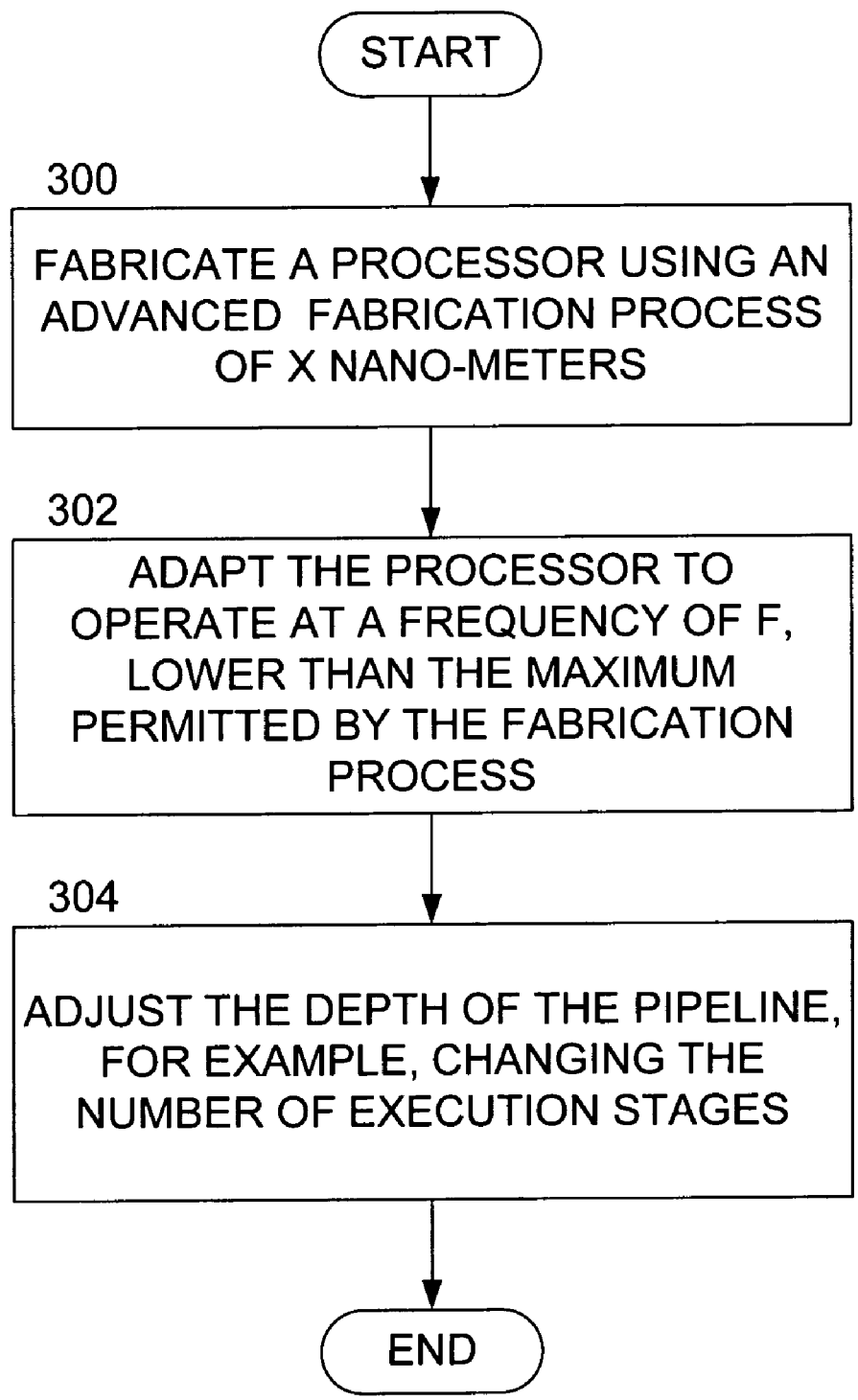
FIG. 7 is a flow diagram illustrating process steps that may be carried out in accordance with one or more aspects of the present invention.

With reference to FIG. 7, in accordance with one or more aspects of the present invention, the processing system 100 is fabricated utilizing an advanced fabrication process of, for example, 65 nm as opposed to 90 nm (action 300). Counter to the conventional wisdom, however, the frequency of operation of the processing system 100 is not increased to the theoretical level associated with the advanced fabrication process. Rather, the frequency of operation is established at a lower level, such as the level associated with the previous fabrication process, e.g., the theoretical maximum frequency associated with the 90 nm process (action 302). In order to counter the trend toward a lower processing performance (due to the lower, or non-maximized, frequency of operation), the depth of the pipeline, e.g., the number of execution stages is altered to account for the likelihood of branch misses, cache misses, interrupts, etc. (action 304). When the depth of the pipeline decreases, with the number of execution stages decreasing, the number of latch point circuits 110 may likewise be decreased. This is preferably achieved by controlling the latch point circuits 110 to operate as buffers. Improved processing in the presence of, for example, branch misses may be achieved while simultaneously reducing the number of latch point circuits 110 operating as latches. This permits one or more clock distribution nodes to be disabled, thereby reducing power dissipation.

Further features that may be employed to improve processing performance while reducing power dissipation in a processing system may be found in co-pending U.S. patent application Ser. No. 11/079,566, entitled METHODS AND APPARATUS FOR IMPROVING PROCESSING PERFORMANCE USING INSTRUCTION DEPENDENCY CHECK DEPTH, filed on Mar. 14, 2005, the entire disclosure of which is incorporated herein by reference.

Figure 8:
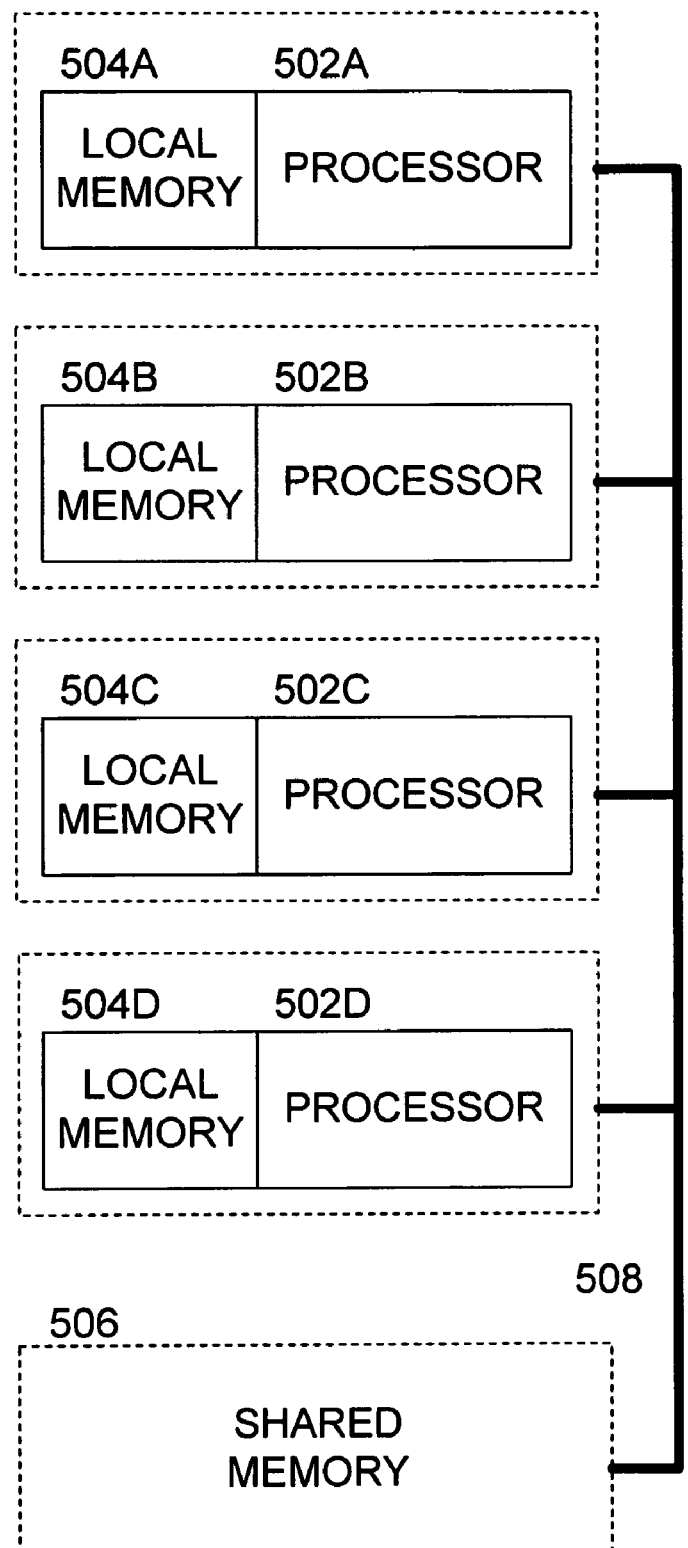
FIG. 8 is a diagram illustrating the structure of a multi-processing system having two or more sub-processors that may be adapted in accordance with one or more aspects of the present invention.
Figure 9:
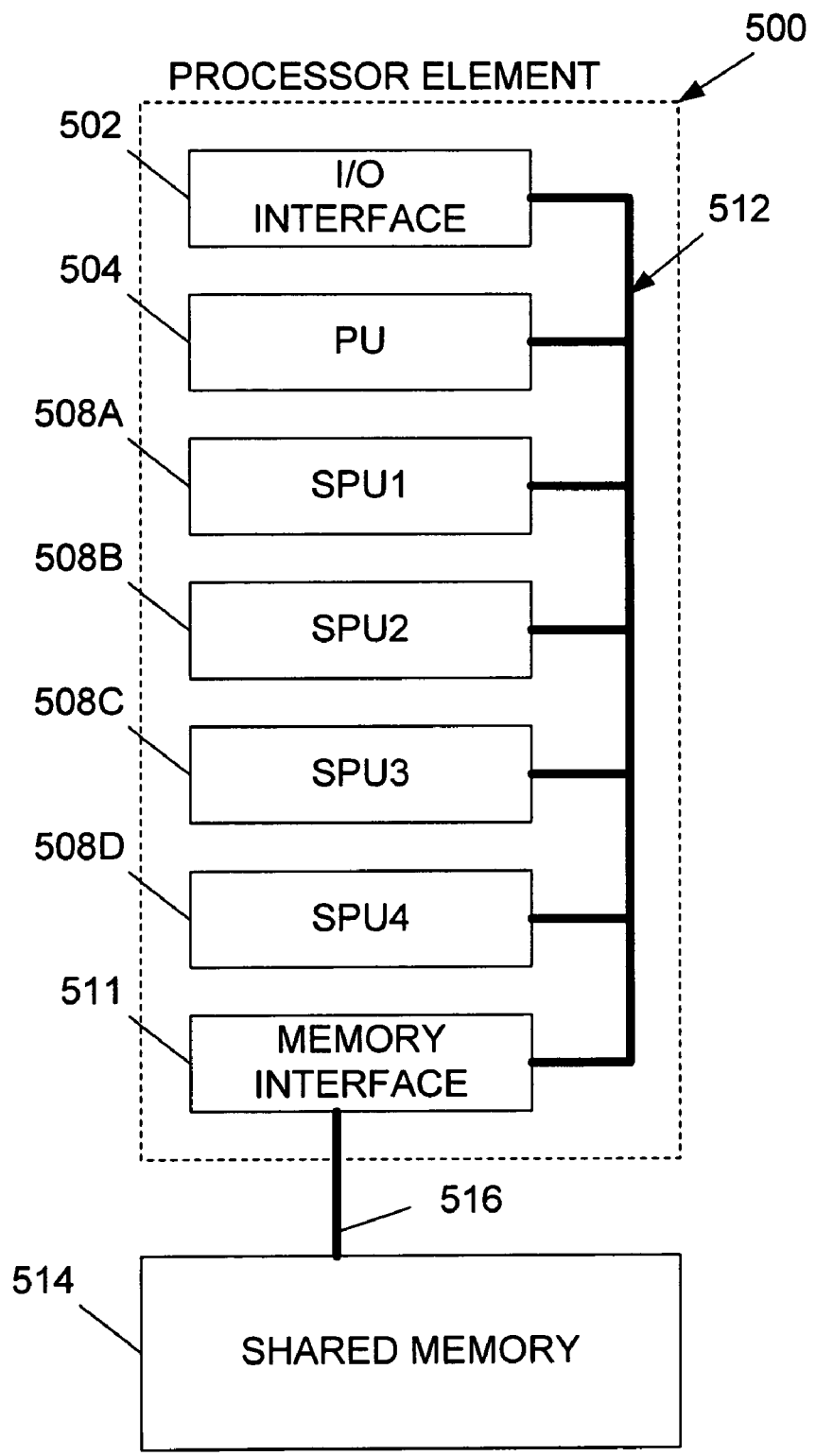
FIG. 9 is a diagram illustrating a preferred processor element (PE) that may be used to implement one or more further aspects of the present invention.
Figure 10:
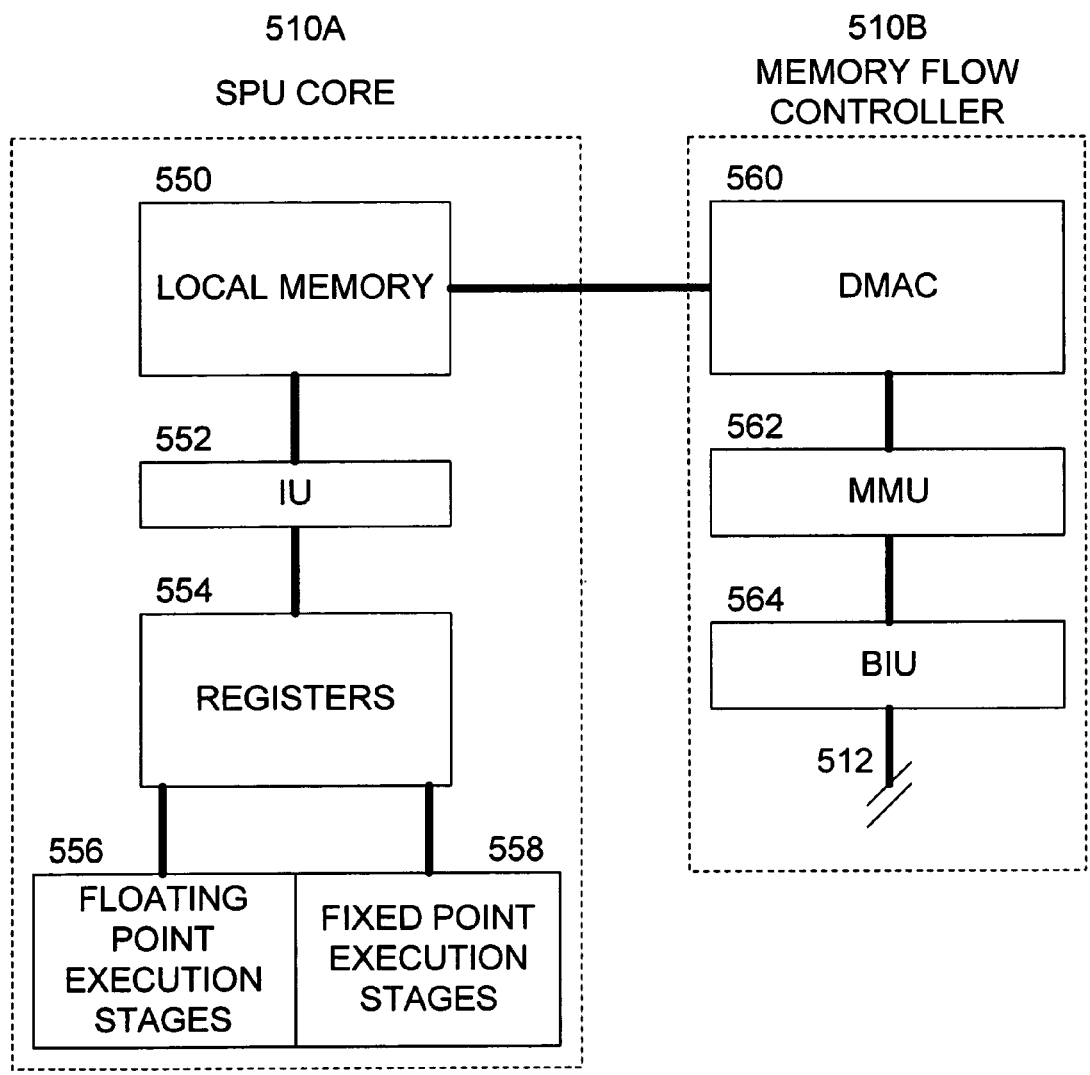
FIG. 10 is a diagram illustrating the structure of an exemplary sub-processing unit (SPU) of the system of FIG. 9 that may be adapted in accordance with one or more further aspects of the present invention.
Figure 11:
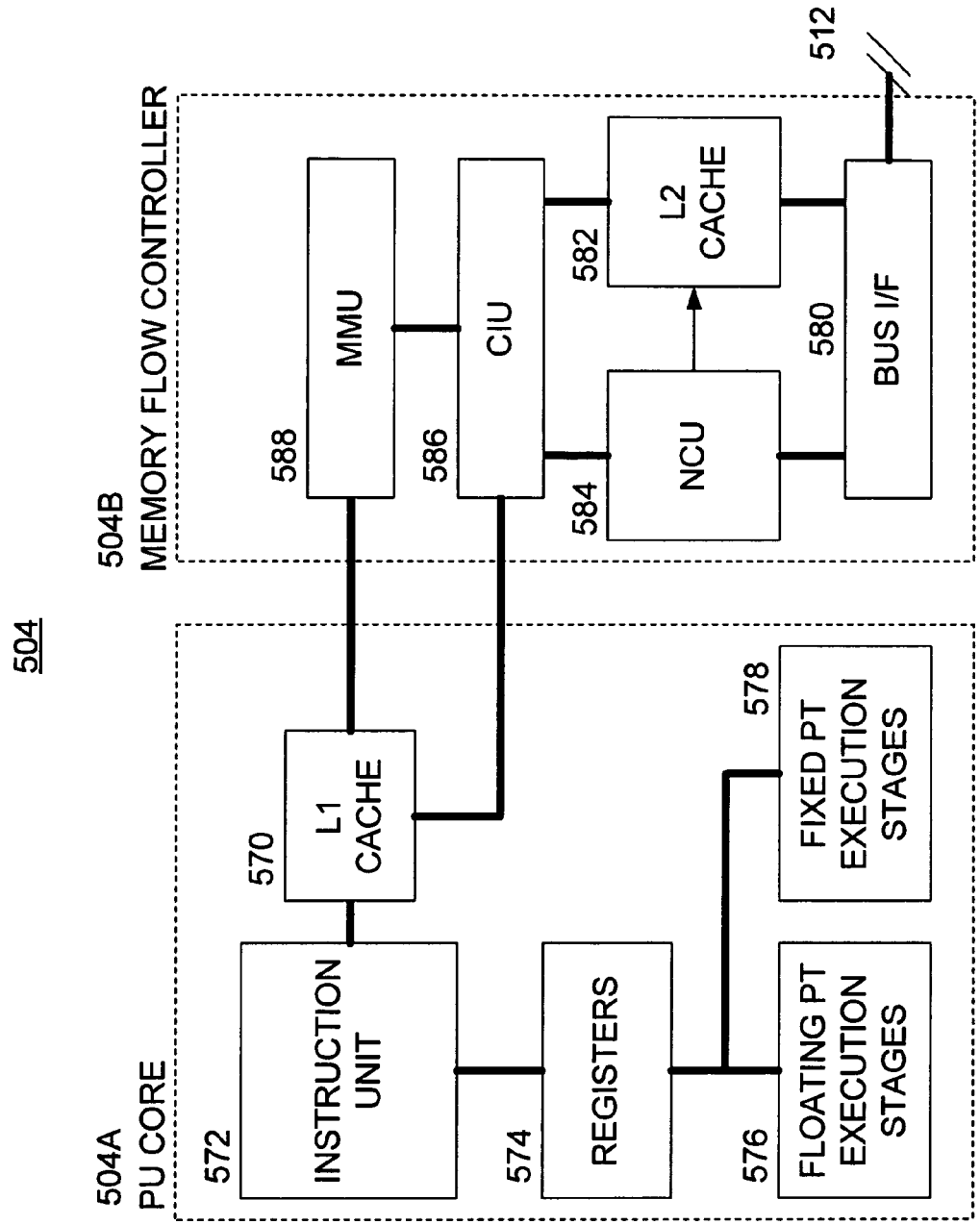
FIG. 11 is a diagram illustrating the structure of an exemplary processing unit (PU) of the system of FIG. 9 that may be adapted in accordance with one or more further aspects of the present invention.

FIG. 8 illustrates a multi-processing system 500A that is adapted to implement one or more further embodiments of the present invention. The system 500A includes a plurality of processors 502A-D, associated local memories 504A-D, and a shared memory 506 interconnected by way of a bus 508. The shared memory 506 may also be referred to herein as a main memory or system memory. Although four processors 502 are illustrated by way of example, any number may be utilized without departing from the spirit and scope of the present invention. Each of the processors 502 may be of similar construction or of differing construction.

The local memories 504 are preferably located on the same chip (same semiconductor substrate) as their respective processors 502; however, the local memories 504 are preferably not traditional hardware cache memories in that there are no on-chip or off-chip hardware cache circuits, cache registers, cache memory controllers, etc. to implement a hardware cache memory function.

The processors 502 preferably provide data access requests to copy data (which may include program data) from the system memory 506 over the bus 508 into their respective local memories 504 for program execution and data manipulation. The mechanism for facilitating data access is preferably implemented utilizing a direct memory access controller (DMAC), not shown. The DMAC of each processor is preferably of substantially the same capabilities as discussed hereinabove with respect to other features of the invention.

The system memory 506 is preferably a dynamic random access memory (DRAM) coupled to the processors 502 through a high bandwidth memory connection (not shown). Although the system memory 506 is preferably a DRAM, the memory 506 may be implemented using other means, e.g., a static random access memory (SRAM), a magnetic random access memory (MRAM), an optical memory, a holographic memory, etc.

Each processor 502 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 502 may include an instruction buffer, instruction decode circuitry, dependency check circuitry, instruction issue circuitry, and execution stages.

As with the embodiments of the invention discussed hereinabove, one or more of the processors 502 (and preferably all of them) are fabricated using an advanced fabrication process (e.g., of X nano-meters as opposed to Y nano-meters), and are adapted to operate at a frequency of F despite that the X nano-meter process would permit a frequency of operation of greater than F. (This results in reduced power dissipation.) One or more of the processors 502 may also include the controllable latch point circuits 110, the variable length pipeline, and/or the controllable clock distribution nodes discussed in detailed hereinabove with respect to FIGS. 1-6. This functionality provides the programmer with the ability to improve processing in the presence of, for example, branch misses while simultaneously reducing power dissipation.

In one or more embodiments, the processors 502 and the local memories 504, may be disposed on a common semiconductor substrate. In one or more further embodiments, the shared memory 506 may also be disposed on the common semiconductor substrate or it may be separately disposed.

In one or more alternative embodiments, one or more of the processors 502 may operate as a main processor operatively coupled to the other processors 502 and capable of being coupled to the shared memory 506 over the bus 508. The main processor may schedule and orchestrate the processing of data by the other processors 502. Unlike the other processors 502, however, the main processor may be coupled to a hardware cache memory, which is operable cache data obtained from at least one of the shared memory 506 and one or more of the local memories 504 of the processors 502. The main processor may provide data access requests to copy data (which may include program data) from the system memory 506 over the bus 508 into the cache memory for program execution and data manipulation utilizing any of the known techniques, such as DMA techniques.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

With reference to FIG. 6, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

FIG. 7 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one ore more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256 MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

FIG. 8 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A processing system, comprising:
an instruction pre-execution circuit operable to prepare instructions of an instruction set for further processing;
an instruction execution circuit having a plurality of execution stages operable to execute the instructions in a pipeline fashion using one clock cycle per stage, each execution stage including digital logic for processing data in accordance with the instructions and at least one latch point circuit operable to latch the data each clock cycle for delivery to a next execution stage, and each of the at least one latch point circuits is operable as a buffer or as a latch; and
a plurality of clock distribution nodes that are operable to be enabled and disabled, wherein:
the number of execution stages of the instruction execution circuit is variable in response to application programming interface (API) code invoked by a software program running on the processing system, and
the clock distribution nodes associated with latch point circuits operating as buffers are disabled.

2. The processing system of claim 1, wherein the latch point circuits is operable as a buffer or as a latch in response to commands from API code.

3. The processing system of claim 2, wherein the number of execution stages of the instruction execution circuit is controllable by the same API code.

4. The processing system of claim 1, wherein the number of execution stages of the instruction execution circuit is controllable by controlling the number of latch point circuits operating as buffers and the number of latch point circuits operating as latches.

5. The processing system of claim 1, wherein the clock distribution nodes are enabled and disabled as a function of API code.

6. The processing system of claim 1, wherein the latch point circuits are disposed at a sufficient pitch such that the data may propagate through the digital logic between successive latch point circuits within one clock cycle.

7. The processing system of claim 1, wherein the processing system is fabricated according to a propagation metric which dictates a minimum pitch for the latch point circuits.

8. The processing system of claim 7, wherein the latch point circuits are disposed at a pitch higher than the minimum pitch.

9. A processing system, comprising:
an instruction pre-execution circuit operable to prepare instructions of an instruction set for further processing; and
an instruction execution circuit having a plurality of execution stages operable to execute the instructions in a pipeline fashion using one clock cycle per stage, each execution stage including digital logic for processing data in accordance with the instructions and at least one latch point circuit operable to latch the data each clock cycle for delivery to a next execution stage, wherein:
each of the latch point circuits is operable as a buffer or as a latch in response to one or more control signals, and the instruction execution circuit is operable to adjust a number of the execution stages of the in response to application programming interface (API) code invoked by a software program running on the processing system in response to running the processing system at a lower frequency of operation.

10. The processing system of claim 9, wherein the one or more control signals are responsive to API code.

11. The processing system of claim 9, further comprising a plurality of clock distribution nodes that are operable to be enabled and disabled.

12. The processing system of claim 11, wherein the clock distribution nodes associated with latch point circuits operating as buffers are disabled.

13. The processing system of claim 11, wherein the clock distribution nodes are enabled and disabled as a function of API code.

14. The processing system of claim 9, further comprising a plurality of processors, each processor including an instruction pre-execution circuit and an instruction execution circuit as claimed.

15. The processing system of claim 14, wherein the processors are fabricated on a common semiconductor substrate.

16. The processing system of claim 15, wherein each processor further includes a local memory within which to store the instructions for execution.

17. A method, comprising:
fabricating a processor using a fabrication process of X nano-meters, which is an advanced process over a Y nano-meter process;
operating the processor at a frequency of F despite that the X nano-meter process would permit a frequency of operation of greater than F such that power dissipation is reduced; and
adjusting a number of execution stages of the instruction execution circuit in response to application programming interface (API) code invoked by a software program running on the processing system to counter a trend of reduced processing power resulting from the lower frequency of operation.

18. A method, comprising:
performing pre-execution processes to prepare instructions of an instruction set for further processing;
executing the instructions in a pipeline of execution stages using digital logic for processing data in accordance with the instructions within one clock cycle per stage;
latching the data each clock cycle for delivery to a next execution stage using one or more of a plurality of latch point circuits;
controlling each of the latch point circuits to operate as a buffer or as a latch; and
enabling distribution of clock signaling to the latch point circuits operating as latches and disabling distribution of clock signaling to the latch point circuits operating as buffers.

19. The method of claim 18, wherein the step of controlling each of the latch point circuits includes using API code to command the latch point circuits to operate as a buffer or as a latch.

20. The method of claim 18, further comprising controlling the number of execution stages in the pipeline.

21. The method of claim 20, wherein the step of controlling the number of execution stages includes using API code to command the number of execution stages in the pipeline.

22. The method of claim 20, wherein the step of controlling the number of execution stages includes controlling the number of latch point circuits operating as buffers and the number of latch point circuits operating as latches.

23. The method of claim 22, wherein the steps of enabling and disabling distribution of clock signaling to the latch point circuits includes using API code to control clock distribution nodes of the processor.

24. A computer readable storage medium containing at least one computer software program which when executed by a processing system causes the processing system to perform actions, the actions comprising:
performing pre-execution processes to prepare instructions of an instruction set for further processing;
executing the instructions in a pipeline of execution stages using digital logic for processing data in accordance with the instructions within one clock cycle per stage;
latching the data each clock cycle for delivery to a next execution stage using one or more of a plurality of latch point circuits;
controlling each of the latch point circuits to operate as a buffer or as a latch; and
enabling distribution of clock signaling to the latch point circuits operating as latches and disabling distribution of clock signaling to the latch point circuits operating as buffers.

25. The storage medium of claim 24, wherein the step of controlling each of the latch point circuits includes using API code to command the latch point circuits to operate as a buffer or as a latch.

26. The storage medium of claim 24, further comprising controlling the number of execution stages in the pipeline.

27. The storage medium of claim 26, wherein the step of controlling the number of execution stages includes using API code to command the number of execution stages in the pipeline.

28. The storage medium of claim 26, wherein the step of controlling the number of execution stages includes controlling the number of latch point circuits operating as buffers and the number of latch point circuits operating as latches.

29. The storage medium of claim 24, wherein the steps of enabling and disabling distribution of clock signaling to the latch point circuits includes using API code to control clock distribution nodes of the processor.

* * * * *